(12) United States Patent
Dunietz et al.

(10) Patent No.: US 8,015,213 B2
(45) Date of Patent: Sep. 6, 2011

(54) CONTENT HAVING NATIVE AND EXPORT PORTIONS

(75) Inventors: Jerry J. Dunietz, Seattle, WA (US); Anthony L. Willie, Woodinville, WA (US); Jason D. Farnsworth, Issaquah, WA (US); Robert A. Relyea, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 414 days.

(21) Appl. No.: 12/147,304

(22) Filed: Jun. 26, 2008

(65) Prior Publication Data

US 2009/0327209 A1   Dec. 31, 2009

(51) Int. Cl.
   *G06F 7/00* (2006.01)
(52) U.S. Cl. .......................... 707/802; 707/803
(58) Field of Classification Search .......... 707/790, 707/802, 796, 803
   See application file for complete search history.

(56) References Cited

U.S. PATENT DOCUMENTS

| 6,901,590 | B2 | 5/2005 | Narayanaswamy et al. | |
|---|---|---|---|---|
| 7,293,070 | B2 | 11/2007 | Moses et al. | |
| 2004/0073925 | A1 | 4/2004 | Kinoshita | |
| 2004/0230576 | A1* | 11/2004 | Hillberg et al. | 707/6 |
| 2005/0210042 | A1* | 9/2005 | Goedken | 707/100 |
| 2006/0041643 | A1 | 2/2006 | Fanshier | |
| 2007/0038994 | A1 | 2/2007 | Davis et al. | |
| 2007/0100969 | A1 | 5/2007 | Hu | |
| 2007/0136659 | A1 | 6/2007 | Adelberg et al. | |
| 2007/0150883 | A1 | 6/2007 | Cohen et al. | |
| 2007/0198742 | A1 | 8/2007 | Pak et al. | |
| 2007/0291035 | A1* | 12/2007 | Vesely et al. | 345/427 |
| 2009/0161147 | A1* | 6/2009 | Klave | 358/1.15 |
| 2009/0222930 | A1* | 9/2009 | Stasi et al. | 726/30 |
| 2010/0088239 | A1* | 4/2010 | Blair et al. | 705/80 |
| 2010/0211886 | A1* | 8/2010 | Forstall et al. | 715/745 |

FOREIGN PATENT DOCUMENTS

| JP | 11215164 | 8/1999 |
|---|---|---|
| KR | 100721561 | 5/2007 |
| WO | WO0124003 A1 | 4/2001 |
| WO | WO0246909 A1 | 6/2002 |

OTHER PUBLICATIONS

"PCT Search Report and Written Opinion", *Application No. PCT/US2009/048821*, (Jan. 29, 2010),12 pages.

"Beta 2 of the XML Paper Specification Essentials Pack released to Web!", retrieved at <<http://blogs.msdn.com/xps/archive/2006/09/08/746616.aspx>>, on Dec. 27, 2007, pp. 1-5.

"Deploying J2EE applications", retrieved at <<https://ssa.usyd.edu.au/docs/eassag/eassag53.htm>>, Sybase Inc., 2005, pp. 1-2.

* cited by examiner

*Primary Examiner* — Angela Lie

(57) ABSTRACT

Content is described having native and export portions. In an implementation, one or more computer-readable media includes instructions that are executable on a computing device to store content in a content container as a native portion and an export portion. The native portion is native to an application that originated the content and the export portion is to provide a published view of the content when the native portion is not supported.

20 Claims, 6 Drawing Sheets

```
                                600

┌──────────────────────────────────────────────────┐
        │                        602                       │
        │ Determine that a native portion of content in a  │
        │       content container is not compatible         │
        │                  with an application              │
        └──────────────────────────────────────────────────┘
                               │
                               ▼
        ┌──────────────────────────────────────────────────┐
        │                        604                       │
        │        Select one of a plurality of export       │
        │  portions included in the content container, in  │
        │   which each of the export portions is configured │
        │      to provide a published view of the content   │
        │   ┌────────────────────────────────────────────┐ │
        │   │                   606                      │ │
        │   │ Which of the plurality of export portions  │ │
        │   │ that are compatible with the application   │ │
        │   │ support a richer display of the content    │ │
        │   │ when compared with other export portions   │ │
        │   │          of the content container          │ │
        │   └────────────────────────────────────────────┘ │
        │   ┌────────────────────────────────────────────┐ │
        │   │                   608                      │ │
        │   │ Which of the plurality of export portions  │ │
        │   │ that are compatible with the application   │ │
        │   │      are modifiable by the application     │ │
        │   └────────────────────────────────────────────┘ │
        └──────────────────────────────────────────────────┘
                               │
                               ▼
        ┌──────────────────────────────────────────────────┐
        │                        610                       │
        │  Output the published view of the content from   │
        │              the selected export portion          │
        └──────────────────────────────────────────────────┘
```

*Fig. 6*

CONTENT HAVING NATIVE AND EXPORT PORTIONS

BACKGROUND

Software developers continue to add and modify applications to provide increased functionality to users. For example, software developers may write new applications that provide functionality in a way that is different from how that functionality was previously provided. Likewise, modifications may be made to existing applications, such as to add new features, modify existing features, delete undesirable features, and so on. However, file formats that are used by these applications, whether new or modified, may be incompatible with existing file formats.

SUMMARY

Content is described having native and export portions. In an implementation, one or more computer-readable media includes instructions that are executable on a computing device to store content in a content container as a native portion and an export portion. The native portion is native to an application that originated the content and the export portion is to provide a published view of the content when the native portion is not supported.

In an implementation, when a determination is made that a native portion of content in a content container is not compatible with an application, an export portion included in the content container is read that is configured to provide a published view of the content. The published view of the content read from the export portion is output.

In an implementation, a determination is made that a native portion of content in a content container is not compatible with an application. One of a plurality of export portions that are included in the content container are selected, in which each of the export portions is configured to provide a published view of the content. The published view of the content is output from the selected export portion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 6 is a flow diagram depicting a procedure in an example implementation in which at least one of the plurality of export portions are selected to be output by an application when the application is not compatible with the native portion in the content container.

DETAILED DESCRIPTION

Overview

Figure 1:
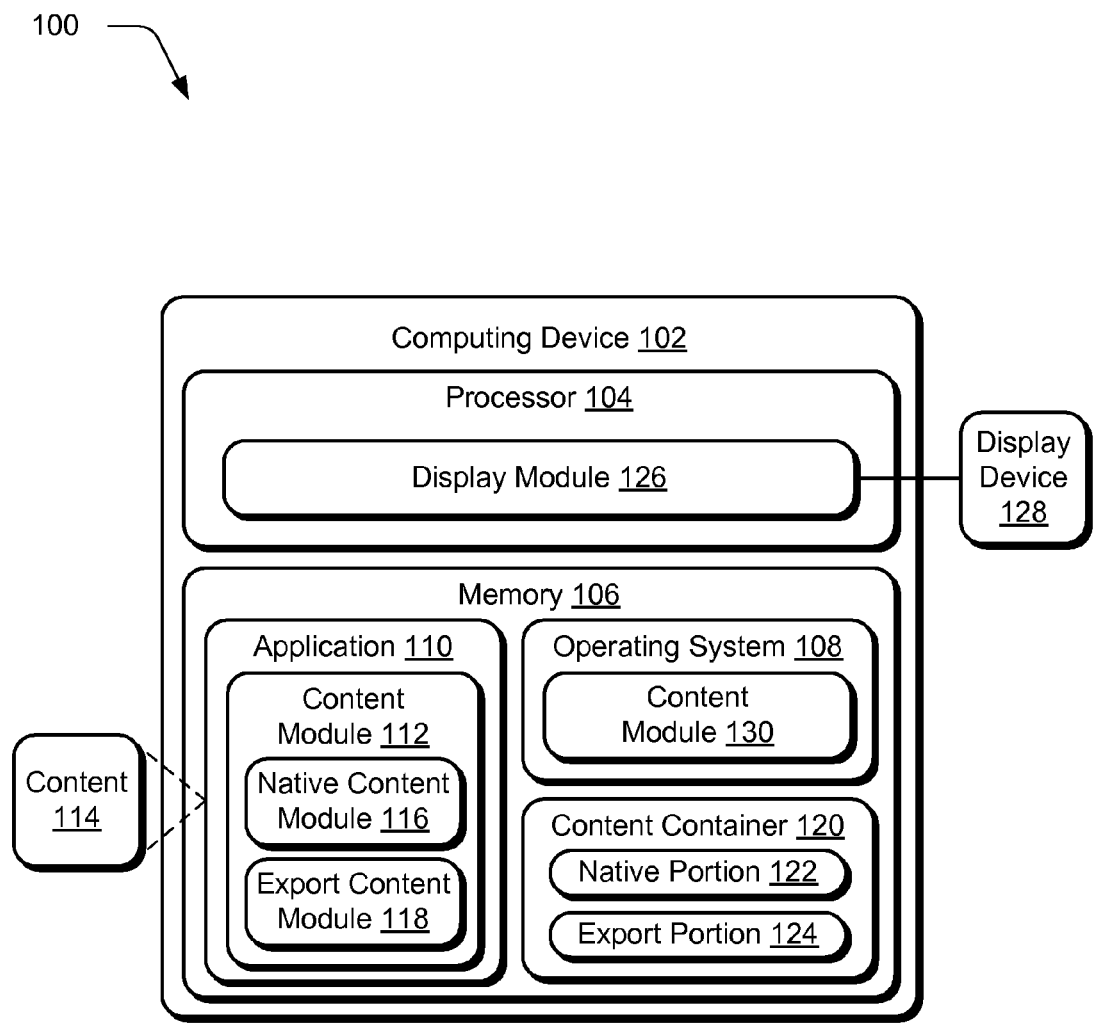
FIG. 1 is an illustration of an environment in an example implementation that is operable to employ techniques involving content having native and export portions

Software developers (e.g., independent software vendors, established software developers, and so on) may produce applications having file formats that are incompatible with existing file formats. For example, a file format may be modified to support functionality that is to be added to an application. However, the modified file format may be incompatible with previous file formats. Likewise, new file formats may be developed that are not compatible with preexisting file formats.

Traditionally, applications having these new formats (whether new or modified) were deployed across a wide installation base before users were able to share content using the applications' native format. A traditional technique that was used to mitigate this issue involved use of an export function. However, use of this traditional technique involved a choice by the user of whether to save content to a native format or export the content to another format. This choice may result is dissemination of different versions of the content that may have wide ranging differences in functionality, e.g., fixed versus modifiable, varying degrees in a richness in display of the content, and so on.

Content having native and export portions is described. In an implementation, a content container is described that may be used to maintain a native portion having content in a native format and an export portion to provide a published view of the content. For example, the native portion may include the content in a format that is native to an application that originated the content, such as content in a new or modified file format. The export portion may provide a published view of the content that may be accessed by applications that are not compatible with the native file format. Thus, when the content container is accessed by an application that does not support the native file format, the application may access the export portion to obtain a published view of the content. In this way, the content container may be freely shared by applications regardless of whether the applications are compatible with the native file format. Applications that are not compatible are able to "fall back" to a compatible version of the content. In an implementation, storage of the content (e.g., use of a "save" command) in the content container is performed such that the native portion and the export portion are stored automatically and without further user intervention.

In an implementation, the content container may support a hierarchical arrangement of export portions. For example, export portions may be stored using different file formats that may support different functionality, such as support for different display techniques (e.g., colors, fonts, animations, and so on), may be fixed or modifiable, and so on. Therefore, an application that is not compatible with the native file format may be provided with a variety of export portions, which may be chosen using a wide variety of considerations, e.g., functionality of the application accessing the content container. A variety of other examples are also contemplated, further discussion of which may be found in relation to FIG. 6.

In the following discussion, an example environment is first described that is operable to employ techniques involving content having native and export portions. Example procedures are then described which may be employed in the example environment. Consequently, implementation of the example procedures is not limited to the example environment and likewise use of the example environment is not limited to performing the example procedures.

Example Environment

FIG. 1 is an illustration of an environment 100 in an example implementation that is operable to employ techniques involving content having native and export portions. The illustrated environment 100 includes a computing device 102 having a processor 104 and memory 106. The computing device 102 may be configured in a variety of ways. For example, the computing device 102 may be configured as a computer that is capable of communicating over a network, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles).

Processor 104 is not limited by the materials from which it is formed or the processing mechanisms employed therein. For example, processor 104 may be comprised of semiconductor(s) and/or transistors (e.g., electronic integrated circuits (ICs)). In such a context, computer-executable instructions may be processor-executable instructions. Alternatively, the mechanisms of or for processors, and thus of or for the computing device 102, may include, but are not limited to, quantum computing, optical computing, mechanical computing (e.g., using nanotechnology), and so forth. Additionally, although a single computing device 102 and processor 104 are shown for sake of clarity of the figure, these devices may be representative of one or more devices. Likewise, although a single memory 106 is shown, a wide variety of types and combinations of memory may be employed, such as random access memory (RAM), hard disk memory, removable medium memory, and other types of computer-readable media.

The computing device 102 is further illustrated as including an operating system 108 and an application 110. The processor 104 may retrieve and execute computer-program instructions from application 110 and/or the operating system 108 to provide a wide range of functionality to the computing device 102. For example, the application 110 may include functionality related to office productivity, email, media management, printing, networking, web-browsing, and so forth. A variety of content related to the application 110 is contemplated examples of which include office documents, multimedia files, emails, data files, web pages, user profile and/or preference data, and so forth. The operating system 108 may work to abstract functionality of the computing device 102 to the application such that the application 110 does not "know" how the underlying functionality is provided, e.g., particularities relating to types of processors, memory, peripheral devices, and so on.

The application 110 is illustrated in FIG. 1 as including a content module 112 that is representative of functionality of the application 110 to interact with content 114. For example, the content module 112 may be configured to read content 114 from particular file formats and/or write content 114 using particular file formats. Accordingly, the content module 112 may be thought of as compatible with file formats from which the content module 112 may read content 114 from and/or write content 114 to. The content 114 is illustrated in phantom from the content module 112 to represent that the storage of the content 114 is initiated and originated by the content module 112 of the application 110 in this example.

The native content module 116 is representative of functionality of the application 110 to read and/or write content 114 using a file format that is native to the application 110. For example, the file format that is native to the application 110 may be configured to support a substantial portion of functionality that is available from the application 110, such as fonts, formats, styles, image display techniques, and so on.

The export content module 118 is representative of functionality of the application 110 to read and/or write content 114 using one or more file formats that are different than the native file format supported by the native content module 116. A variety of different export file formats may be supported, further discussion of which may be found in relation to FIG. 2.

The content module 112, through use of the native content module 116 and the export content module 118, is also representative of functionality of the application 110 to read from and/or write to a content container 120 having a native portion 122 and an export portion 124. The content container 120 may be implemented in a variety of ways, such as a file that contains one or more files having the native portion 122 and one or more files having the export portion 124. In another example, the native portion 122 may be interleaved with the export portion 124, such as through the use of tags. Thus, the native portion 122 and the export portion 124 may share content at least a portion of the content in some examples.

The native portion 122 is representative of a version of content 114 that is stored in and/or read from the content container 120 by the native content module 116. Thus, the native portion describes a version of content 114 that is native to the application 110 as opposed to other file formats that, while supported by the application 110, are not a default option to store content 114 by the application 110.

The export portion 124 is representative of functionality to provide a published view of content 114 in the native portion 122 to applications that are not compatible with the native file format of the application 110. For example, the export content module 118 may be configured to form a published version of the content 114 in the native portion 122 of the content container 120. The published version obtained from the export portion 124 of the content container 120 may be used by applications that are not compatible with the native portion 122 of the content 120, further discussion of which may be found in relation to FIG. 2. In this way, the content container 120 may be accessed by applications regardless of whether the applications are compatible with the native file format of the application 110. Thus by including both the native portion 122 and the export portion 124 in the content container 120, the content 114 may be communicated between applications regardless of compatibility yet still provide those applications with corresponding functionality. For instance, an application that is not compatible with the native file format may communicate the content container 120 to another application that is compatible. This other application may then access content from the native portion 122, which was not possible using traditional export or save techniques.

The computing device 102 is further illustrated as including a display module 126 that is suitable to receive content read by the content module 112 to be rendered for output to a display device 128. For example, the display module 126 may incorporate device driver functionality that communicates with the operating system 108 to cause content from the content container 120 to be rendered for display.

Although the content module 112 has been described as a part of the application 110, the content module 112 may be implemented in a variety of different ways. For example, the operating system 108 is also illustrated as including a content module 130 which may include similar functionality as described for content module 110. In this example, the content module 130 (through incorporation with the operating system 108) may abstract this functionality to other applications, such as to read and/or write content in the content container 120. A variety of other examples are also contemplated, such as a "stand alone" content module, e.g., configured to work as a content viewer.

Figure 2:
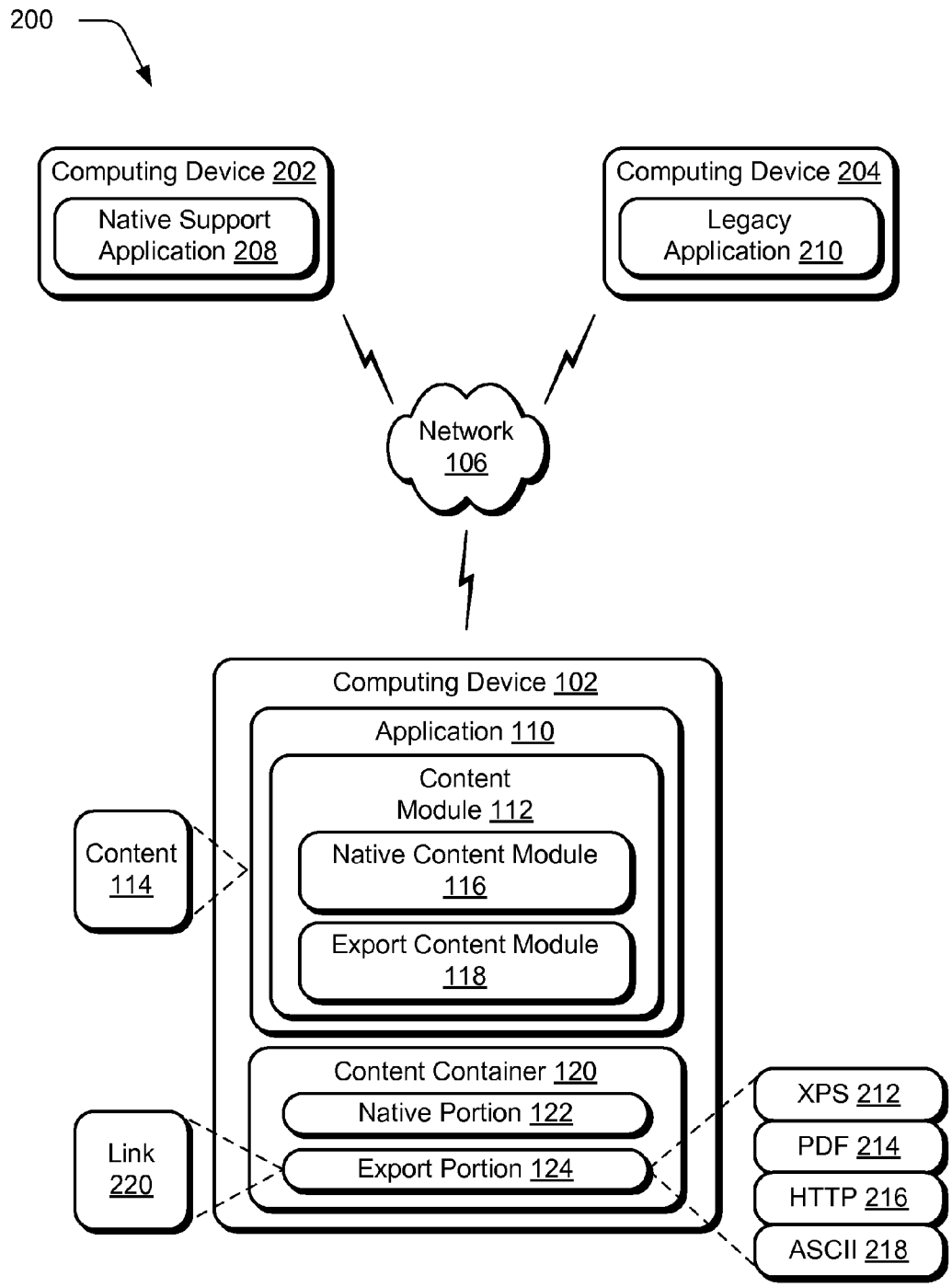
FIG. 2 is an illustration of a system in an example implementation showing a computing device of FIG. 1 in greater detail as communicating with other computing devices via a network.

FIG. 2 illustrates a system 200 that shows the computing device 102 of FIG. 1 in greater detail as communicating with other computing devices 202, 204 via a network 206. As before, the computing device 102 includes the application 110 having the content module 112 with the native content module 116 and the export content module 118. The computing device 102 also includes the content container 120 having the native portion 122 and the export portion 124 as previously described.

Computing device 202 is illustrated as including a native support application 208, which is representative of an application that is compatible with application 110. For example, the native support application 208 may include functionality represented by the native content module 116 to read and/or write content in a file format that is native to application 110. Thus, the native support application 208 may read from the native portion 122 of the content container 122 to interact with content 114.

Computing device 204, however, is illustrated as including a legacy application 210 that is not compatible with application 110. Consequently, legacy application 210 is not configured to read and/or write to the native portion 122 of the content container 120. Therefore, legacy application 210 may access the export portion 124 to obtain a published version of the content 114 in the native portion 122.

The export portion 124 may comply with a variety of different file formats to store the content 114 as a publishable version. As illustrated in this system 200 of FIG. 2, for instance, the export portion 124 may be built to be compliant with XML Paper Specification (XPS) 212 (e.g., Version 1), Portable Document Format (PDF) 214, Hypertext Transfer Protocol (HTTP) 216, American Standard Code for Information Interchange (ASCII) 218, and so on.

In an implementation, the export portion 124 may be representative of a plurality of export portions that may be included in the content container 120. For example, the content container 120 include an export portion that is compliant with XPS 212 and another export portion that is compliant with HTTP 216. Therefore, the legacy application 210 may be provided with a variety of options to publish versions of the content. This variety of options may be used to support a variety of different functionality.

For example, the content container 120, and more particularly the export portion 124, may support a cascading technique. Legacy application 210, for instance, may not be configured to support XPS 212, but may support PDF 214. Thus, the legacy application 210 is still provided with an option that is compatible with the legacy application 210. A variety of other examples are also contemplated, further discussion of which may be found in relation to FIG. 6.

The export content module 118 may also provide a variety of other functionality in conjunction with the export portion 124. For example, the export content module 118 may configure the export portion 124 to include a link 220. The link 220 may provide a variety of different functionality, such as a link to a stand-alone content module 112 (e.g., a viewer) that is configured to read the content from the native portion 122, a link to a website that may be used to purchase the application 110 and/or the content module 112, and so on.

Figure 3:
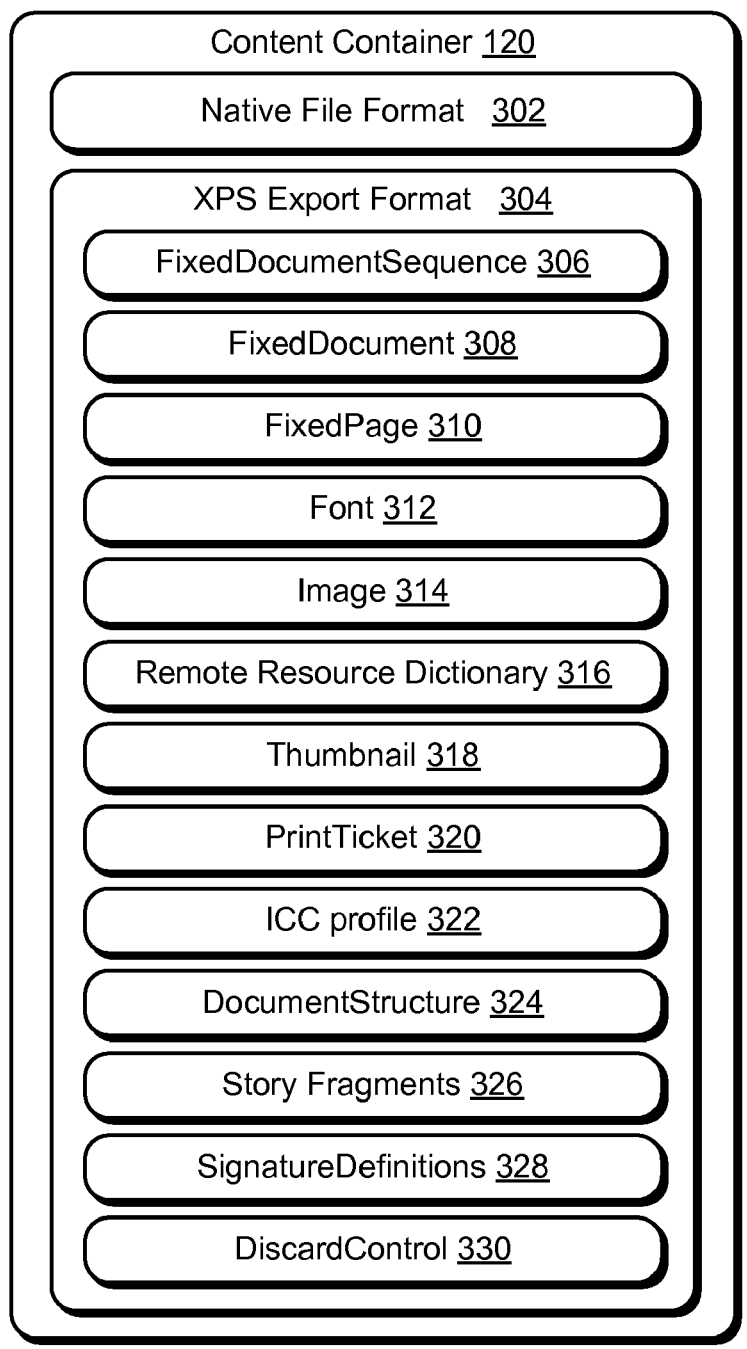
FIG. 3 depicts an example implementation of a content container of FIGS. 1 and 2 as having an export portion that complies with XPS.

FIG. 3 depicts an example implementation 300 of the content container 120 of FIGS. 1 and 2 as having an export portion that complies with XPS. The context of the example described just below is one in which the content container 120 may be built to be compliant with the XML Paper Specification (XPS) Version 1. It is to be appreciated and understood that the various embodiments described in this document can be employed in connection with other standards that are different from the XPS standard without departing from the spirit and scope thereof. In addition, the various embodiments can be employed in connection with subsequent versions of the XPS Specification.

The content container 120 is illustrated as including data stored in a native file format 302 and data stored in an XPS export format 304. Data in the native file format 302 may be configured in a variety of different ways to support functionality of applications that read to and/or right from this format as described in relation to the previous figures.

The export portion 124 is illustrated as being configured according to XPS 212 and thus is illustrated as an XPS export format 304. As a brief overview of the XPS standard, consider the following. The XML Paper Specification, or XPS, describes a set of conventions for the use of XML and other technologies to describe content, e.g., an appearance of paginated documents. XPS was developed to ensure interoperability of independently created software and hardware systems that produce or consume XPS content. The XPS specification defines formal features that producers and consumers satisfy in order to achieve interoperability.

The XPS specification describes a paginated-document format called the XPS Document. The format features involve an extension of the packaging features described in the Open Packaging Conventions specification. That specification describes packaging and physical format conventions for the use of XML, Unicode, ZIP, and other technologies and specifications to organize content and resources that make up a document.

The XPS Document format represents one or more related pages with a fixed layout, which are organized as one or more documents, in the traditional meaning of the word. A file that implements this format provides support to fully render those documents on a display device or physical medium (for example, paper). This includes resources such as fonts and images that might be used to render individual page markings and thus publish content in the XPS document.

In addition, the format includes optional components that build on the minimal set of components that are used to render a set of pages. This includes an ability to specify print job control instructions, to organize the minimal page markings into larger semantic blocks such as paragraphs, and to physically rearrange the contents of the format for easy consumption in a streaming manner, among others.

The XPS Document format uses a ZIP archive for its physical model. The Open Packaging Conventions specification describes a packaging model, that is, how the package is represented internally with parts and relationships. The XPS Document format further includes a set of parts and relationships, each fulfilling a particular purpose in the document.

The format also extends package features, including digital signatures, thumbnails, and interleaving.

The packaging conventions described in the Open Packaging Conventions specification may be used to carry a variety of payloads related to content. A payload is a complete collection of interdependent parts and relationships within a package. The XPS specification defines a particular payload that contains a static or "fixed-layout" representation of paginated content: the fixed payload that is not-modifiable.

A package that holds at least one fixed payload and follows the rules described in the XPS specification is referred to as an XPS Document. Producers and consumers of XPS Documents can implement their own parsers and rendering engines based on this specification.

Using known rendering rules, XPS Documents may be unambiguously reproduced or printed without tying computing devices or applications to specific operating systems or service libraries. Because the XPS Document is expressed in a neutral, application-independent way, the content can be viewed and printed without the application used to create the package.

A payload that has a FixedDocumentSequence root part is known as a fixed payload. A fixed payload root is a FixedDocumentSequence part that references FixedDocument parts that, in turn, reference FixedPage parts. There can be more than one fixed payload in an XPS Document.

A specific relationship type is defined to identify the root of a fixed payload within an XPS Document: the XPS Document StartPart relationship. The primary fixed payload root is the FixedDocumentSequence part that is referenced by the XPS Document StartPart relationship. Consumers such as viewers or printers use the XPS Document StartPart relationship to find the primary fixed payload in a package. The XPS Document StartPart relationship points to the FixedDocumentSequence part that identifies the root of the fixed payload.

The payload includes the full set of parts used to process the FixedDocumentSequence part. Content to be rendered is contained in the XPS Document. The parts that can be found in an XPS Document are listed the table just below, some of which are described in more detail below the table.

FixedDocumentSequence 306 Part

The FixedDocumentSequence 306 part assembles a set of fixed documents within the fixed payload. For example, a printing client may assemble two separate documents, a two-page cover memo and a twenty-page report (both are FixedDocument parts), into a single package to send to the printer.

The FixedDocumentSequence 306 part serves as a root of a fixed payload. Even if an XPS Document contains a single fixed document, the FixedDocumentSequence 306 part is still used. One FixedDocumentSequence 306 part per fixed payload is used.

Fixed document sequence markup specifies each fixed document in the fixed payload in sequence, using <DocumentReference> elements. The order of <DocumentReference> elements determines document order and is preserved by editing consumers. Each <DocumentReference> element may reference a FixedDocument part by relative URI.

FixedDocument 308 Part

The FixedDocument 308 part is a root for each page within the document. A fixed document identifies the set of fixed pages for the document. The markup in the FixedDocument 308 part specifies the pages of a document in sequence using <PageContent> elements. The order of <PageContent> elements determines page order and is preserved by editing consumers. Each <PageContent> element should reference a FixedPage part by relative URI.

FixedPage 310 Part

The FixedPage 310 part contains each of the visual elements to be rendered on a page. Each page has a fixed size and orientation. The layout of the visual elements on a page is determined by the fixed page markup. This applies to both graphics and text, which is represented with precise typographic placement. The contents of a page are described using a powerful but simple set of visual primitives.

Each FixedPage 310 part specifies the contents of a page within a <FixedPage> element using <Path> and <Glyphs> elements (using various brush elements) and the <Canvas> grouping element. The <ImageBrush> and <Glyphs> elements (or their child or descendant elements) may reference Image parts or Font parts by URI, e.g., may reference these parts by relative URI.

| Name | Description |
| --- | --- |
| FixedDocumentSequence 306 | Specifies a sequence of fixed documents. |
| FixedDocument 308 | Specifies a sequence of fixed pages. |
| FixedPage 310 | Contains the description of the contents of a page. |
| Font 312 | Contains an OpenType or TrueType font. |
| Image 314: JPEG image PNG image TIFF image Windows Media Photo image | References an image file. |
| Remote resource dictionary 316 | Contains a resource dictionary for use by fixed page markup. |
| Thumbnail 318 | Contains a small JPEG or PNG image that represents the contents of the page or package. |
| PrintTicket 320 | Provides settings to be used when printing the package. |
| ICC profile 322 | Contains an ICC Version 2 color profile optionally containing an embedded Windows Color System (WCS) color profile. |
| DocumentStructure 324 | Contains the document outline and document contents (story definitions) for the XPS Document. |
| StoryFragments 326 | Contains document content structure for a fixed page. |
| SignatureDefinitions 328 | Contains a list of digital signature spots and signature requirements. |
| DiscardControl 330 | Contains a list of resources that are safe for consumers to discard during processing. |

Image 314 Parts

Image 314 parts reference image files. A single image may be shared among multiple fixed pages in one or more fixed documents. Images referenced in markup are internal to the package. References to images that are external to the package are not valid.

Images are included in XPS Documents with an <Image-Brush> element and an ImageSource attribute to reference a part with the appropriate content type. XPS Documents may support a variety of image formats: JPEG, PNG, TIFF, and Windows Media Photo.

Thumbnail 318 Parts

Thumbnails 318 are small images that represent the contents of a fixed page or an entire XPS Document. For example, thumbnails 318 may be used to enable users of viewing applications to select a page. Thumbnail 318 images may be attached using a relationship to the FixedPage 310 parts. Each FixedPage 310 part does not have more than one thumbnail part attached.

Although the Open Packaging Conventions specification allows thumbnails 318 to be attached to any part, XPS Document consumers may process thumbnails associated via a package relationship from the package as a whole or via a relationship from a FixedPage 310 part. These thumbnails are typically in JPEG or PNG format. Thumbnails 318 attached to other parts may be ignored by XPS Document consumers.

Font 312 Parts

Fonts 312 are stored in font parts. XPS Documents support the OpenType font format, which includes TrueType and CFF fonts. To support portability, Unicode-encoded fonts may be used.

Font 312 parts are referenced using the FontUri attribute of the <Glyphs> element. A single font may be shared among multiple fixed pages in one or more fixed documents 308. Font references are internal to the package, thus, external references to fonts are invalid.

If the referenced font part is a TrueType Collection, the fragment portion of the URI indicates the font face to be used. The use of URI fragments is specified in the BNF of Generic URI Syntax specification. The fragment contained in the FontURI attribute value is an integer between 0 and n−1 inclusive, where n is the number of font faces contained in the TrueType Collection. For example, to reference the first font face in the font part "../Resources/Fonts/CJKSuper.ttc", the value of the FontUri attribute is "../Resources/Fonts/CJKSuper.ttc#0". If a fragment is not specified, the first font face is used in the same way as if the URI had specified "#0".

Remote Resource Dictionary 316 Parts

A remote resource dictionary 316 allows producers to define resources that may be reused across many pages, such as a brush. This is stored in a Remote Resource Dictionary 316 part.

PrintTicket 320 Parts

PrintTicket 320 parts provide user intent and device configuration information to printing consumers. PrintTicket 320 parts are processed when the XPS Document is printed. PrintTicket 320 parts are attached to FixedDocumentSequence 306, FixedDocument 308 and FixedPage 310 parts and each of these parts attaches no more than one PrintTicket 320. PrintTickets 320 may provide override settings to be used when printing the part to which they are attached.

SignatureDefinitions 328 Part

Producers may add digital signature requests and instructions to an XPS Document in the form of signature definitions. A producer may sign against an existing signature definition to provide additional signature information. A recipient of the document may also sign the XPS Document against a signature definition—this is referred to as "co-signing." Digital signature definitions are stored in a SignatureDefinitions 328 part. A FixedDocument 308 part refers to a SignatureDefinitions 328 part using a relationship of the SignatureDefinitions 328 type.

DocumentStructure 324 Part

Explicitly authored document structure information is stored in the DocumentStructure 324 part. This part contains the document outline and defines the framework for each element in fixed pages in terms of semantic blocks called stories. Stories are split into StoryFragments 326 parts, which contain content structure markup that defines semantic blocks such as paragraphs and tables.

Document structure markup contains a root <DocumentStructure> element. The <DocumentStructure> element uses a Document Structure namespace.

The DocumentStructure 324 part is referenced by relationship from the FixedDocument 308 part. Consumers may provide an algorithmic construction of the structure of an XPS Document based on a page-layout analysis, but cannot use such a method to derive structure for a part of the XPS Document included in the DocumentStructure part. For example, a consumer capable of calculating reading order from the layout of the document uses the reading order specified in the DocumentStructure 324 part, even though the derived order may be perceived as preferable to the specified order.

StoryFragments 326 Part

The StoryFragments 326 part contains content structure markup (for example, for tables and paragraphs) associated with a single fixed page.

StoryFragments 326 part markup contains a root <StoryFragments> element. The <StoryFragments> element uses a specified Document Structure namespace.

In accordance with the principles described above, the markup that describes a particular XPS document can be considered as a hierarchical representation of information or data which can be processed or converted into a file that can be rendered on a consuming device.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, e.g., memory 106 of FIG. 1. The features of the techniques involving content having native and export portions described below are platform-independent, meaning that the techniques may be implemented on a variety of commercial computing platforms having a variety of processors.

Example Procedures

The following discussion describes native and export content techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, the system 200 of FIG. 2 and/or the embodiment 300 of FIG. 3.

Figure 4:
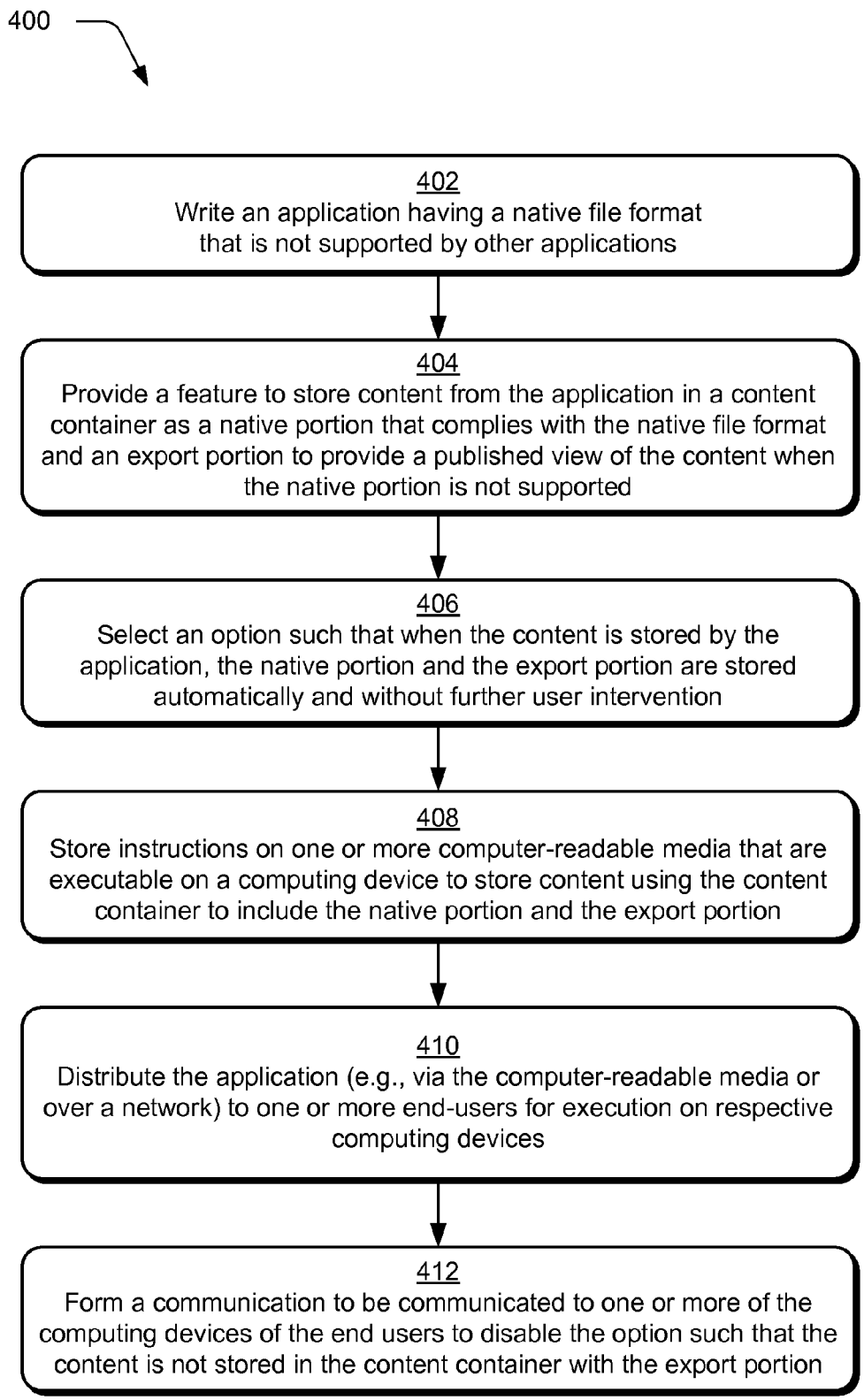
FIG. 4 is a flow diagram depicting a procedure in an example implementation in which an application is written that includes an option to store a version of content that is native to the application in a native portion and a version of the content that is not native to the application in an export portion.

FIG. 4 depicts a procedure 400 in an example implementation in which an application is written that includes an option to store a version of content that is native to the application in a native portion and a version of the content that is not native to the application in an export portion. An application is written having a native file format that is not supported by other applications (block 402). For example, the application may make modifications to a pre-existing file format such that the modified file format is not supported by other applications. In another example, a new file format may be created to support functionality in a new application.

A feature is provided to store content from the application in a content container as a native portion that complies with the native file format and an export portion to provide a published view of the content when the native portion is not supported (block 404). As previously described, the application 110 may include a content module 112 having a native content module 116 configured to write content 114 in a native file format and an export content module 118 to export the content 114 to be consumed other applications that are not compatible with the native file format.

An option is selected such that when the content is stored by the application, the native portion and the export portion are stored automatically and without further user invention (block 406). For example, the option may specify that when a state command is initiated by a user of the application, the content container 120 is automatically created to include the native portion 122 and the export portion 124. Thus, in this example the native and export portions 122, 124 are created through selection of a single command. A variety of other examples are also contemplated, such as through manual specification of the native portion 122 and/or the export portion 124, e.g., such as to specify particular file formats to be used by the export portion of 124.

Instructions are stored on one or more computer readable media that are executable on a computing device to store content using the content container to include the native portion and the export portion (block 408). The application is then distributed to one or more end-users (e.g., via the computer readable media or over a network) for execution on respective computing devices (block 410). For example, the instructions may be written to a hard drive (e.g., from a download via the Internet), on a digital video disc (DVD), and so on.

A communication is formed to be communicated to one or more of a computing device as of the end users to disable the option such that the content is not stored in the content container using the export portion (block 412). As previously described, when applications were traditional deployed with a native file format that was "new", it was traditionally difficult for users to share documents using the application's native format until the application achieved a wide installation base.

By including the native portion 122 and the export portion in the content container 120, the content 114 may be distributed to and consumed by applications that are not compatible with the native file format. However, a point in time may be reached when the application 110 has achieved wide distribution. Therefore, in such an instance a developer of the application 110 may choose to have the application 110 default to saving content 114 in a native file format without saving the content 114 saved in an export file format, e.g., such as to save storage space consumed by the content container 120. Therefore, in this example the option that was originally selected (e.g., at block 406) to cause formation of the content container 120 to include the export portion 124 automatically and without user intervention may be disabled remotely by the developer of the application 110 e.g., such as part of a software update to the application 110. A variety of other examples are also contemplated.

Figure 5:
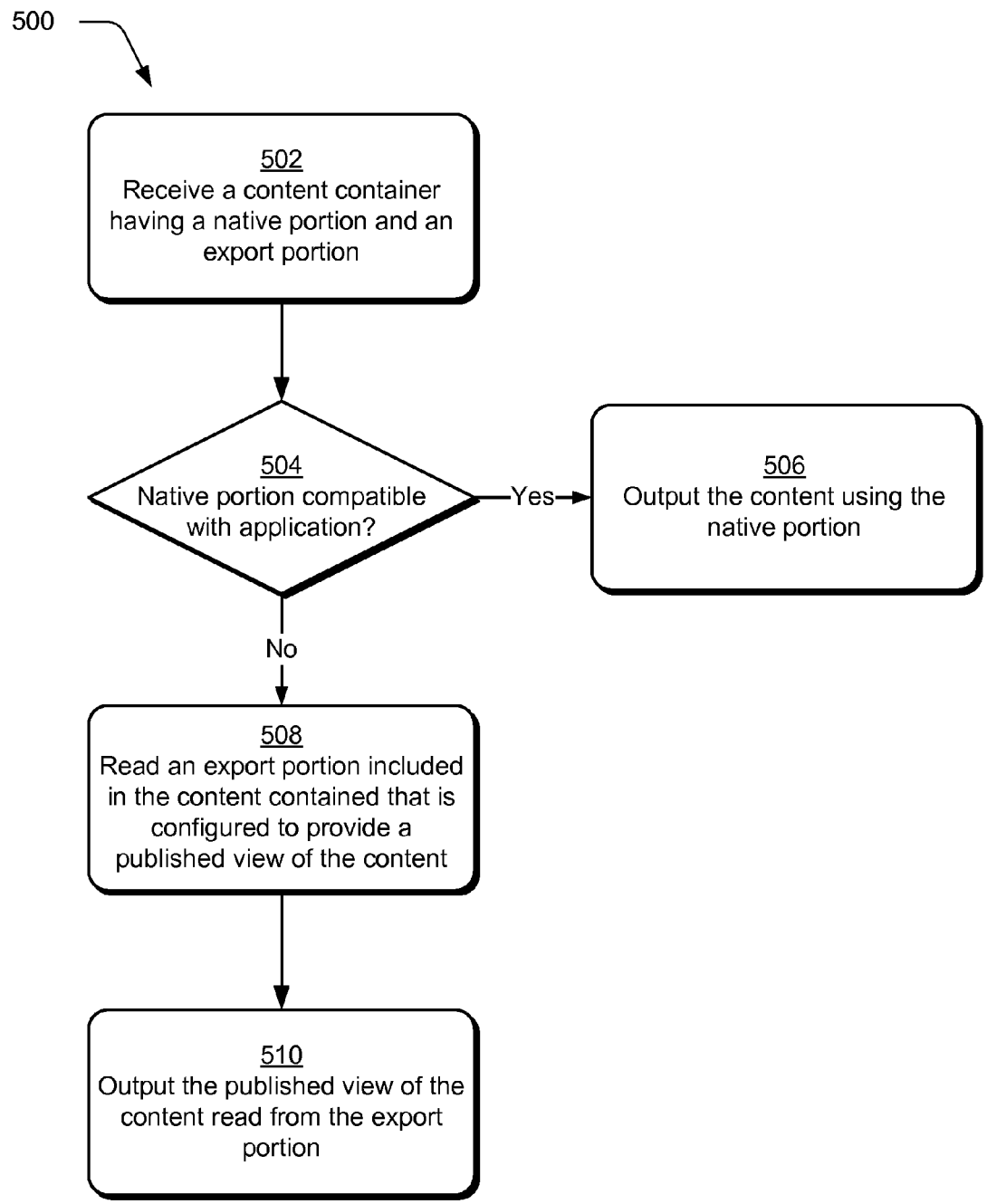
FIG. 5 is a flow diagram depicting a procedure in an example implementation in which the application of FIG. 4 is deployed to and used by an end user.

FIG. 5 depicts a procedure 500 in an example implementation in which the application of FIG. 4 is deployed to and used by an end user. A content container is received having a native portion and an export portion (block 502). For example, the content can be communicated over a network (e.g., the Internet), received via a computer readable medium, and so on.

A determination is made as to whether the native portion is compatible with an application (decision block 504). For example, the native support application 208 may be executed on the computing device 202. A user may then initiate an open command to open the content container 120 having the native portion 122 and the export portion 124. The native support application 208 may then make the determination that the native portion 122 is compatible ("yes" from decision block 504). Accordingly, the content is output using the native portion (block 506) of the content container 120.

In another example, the legacy application 210 may be executed on the computing device 204. A user may then initiate an open command to open the content container 120. The native support application 208 may then make a determination that the native portion 122 is not compatible ("no" from decision block 504). Accordingly, an export portion is read that is included in the content container that is configured to provide a published view of the content (block 508). The published view of the content read from the export portion is then output (block 510). For example, the export portion 124 may be compliant with the XPS 212 format such that relevant data used to publish the content is included within the export portion 124, such as embedded fonts, images, and so on. In this way, the export portion 124 may publish the content to applications that are not compatible with the native portion 122, e.g., are not compatible with the native file format of the application 110 that originated the content in the native portion 122. A variety of other examples are also contemplated to publish content, such as file formats that include PDF 214, HTTP 216, ASCII 218, and so on. Further, the export portion 124 may be configured to support a variety of fallback functionality, further discussion of which may be found in relation to the following procedure.

FIG. 6 depicts a procedure 600 in an example implementation in which at least one of the plurality of export portions are selected to be output by an application when the application is not compatible with the native portion in the content container. A determination is made that a native portion of content in a content container is not compatible with application (block 602). The determination may be made in a variety of ways as described in relation to the previous figures.

One of a plurality of export portions included in the content container are selected, in which each of the export portions is configured to provide a published view of the content (block 604). A variety of different considerations may be employed as a basis for the selection. For example, one such consideration includes which of the plurality of export portions that are compatible with the application support a richer display of the content when compared with other export portions of the content container (block 606). For instance, the legacy application 210 may be compatible with HTTP 216 and ASCII 218. Therefore, in this instance the legacy application 210 may select the HTTP 216 file format as supporting a richer display of content (e.g., fonts, images, and so on) when compared to the display supported by ASCII 218.

Another such consideration includes which of a plurality of export portions that are compatible with the application are modifiable by the application (block 608). For example, one of the export portions 124 may support modifications to the content whereas another one of export portions 124 may not. Therefore, in this instance the legacy application 210 may choose to open the export portion that supports modifications. Although a variety of examples have been described of considerations that may be employed to select from a plurality of export portions, it should be readily apparent that this list of examples is not exhaustive as a variety of other examples are also contemplated without departing from the spirit and scope thereof.

The published view of the content is then output from the selected export portion (block 610). For example, the legacy application 210 may output a published view of the content for rendering by a display device, a speaker, and so on.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. One or more computer-readable storage devices comprising instructions that are executable on a computing device to store content in a content container including both:
   a native portion that is in a native file format compatible with an application that originated the content to render a native version of the content; and
   an export portion separate from the native portion in a different file format to enable rendering of a published view of the content when the native version is not supported by a consuming application, the native portion and the export portion representing alternate fully renderable versions of the same content in the content container.

2. One or more computer-readable storage devices as described in claim 1, wherein access to the native portion by an application that supports the native portion provides at least one function that is not available to the application when accessing the export portion.

3. One or more computer-readable storage devices as described in claim 1, wherein:
   the content container includes a plurality of said export portions; and
   the plurality of said export portions support cascading fallback such that a particular said export portion is selectable by an application that does not support the native portion based on one or more capabilities of the application that does not support the native portion.

4. One or more computer-readable storage devices as described in claim 1, wherein the instructions are configured to store the content in the content container automatically and without additional user intervention responsive to selection of a save command by a user.

5. One or more computer-readable storage devices as described in claim 1, wherein:
   the export portion includes a plurality of said export portions to provide a published view of the content when the native content is not supported; and
   at least one said export portion is configured according to a format that is different from another said export portion.

6. One or more computer-readable storage devices as described in claim 1, wherein the export portion and the native portion share at least a portion of the content.

7. One or more computer-readable storage devices as described in claim 1, wherein the export portion and the native portion are interleaved, one to another.

8. One or more computer-readable storage devices as described in claim 1, wherein the export portion is configured according to an XML Paper Specification (XPS).

9. One or more computer-readable storage devices as described in claim 1, wherein the instructions include the application.

10. One or more computer-readable storage devices as described in claim 1, wherein the application is included as part of an operating system that is executable on the computing device.

11. One or more computer-readable storage devices as described in claim 1, wherein the content container is a file that contains a plurality of other files, at least two of which include a file having the native portion and another file having the export portion.

12. A method comprising:
   when a determination is made that a native portion of content contained in a content container and having a native file format to enable rendering of a native version of the content is not compatible with an application, reading an export portion included in the content container that is separate from the native portion in a different file format and configured to enable rendering of a published view of the content, the native portion and the export portion representing alternate fully renderable versions of the same content in the content container; and
   outputting the published view of the content read from the export portion.

13. A method as described in claim 12, wherein the export portion is configured according to an XML Paper Specification (XPS).

14. A method as described in claim 12, wherein the reading and the outputting are performed by the application.

15. A method as described in claim 12, wherein the reading and the outputting are performed by the application as part of an operating system.

16. A method as described in claim 12, wherein the export portion includes a link to one or more modules that are configured to read the native portion and output a result of the read.

17. A method comprising:
   determining that a native portion of content for a document in a content container having a native file format to render a native version of the document is not compatible with an application;
   selecting one of a plurality of export portions included separately from the native portion in the content container, in which each said export portion is configured to enable rendering of a published view of the document using a respective file format, the native portion and the plurality of export portions each representing an alternate fully renderable version of the same content for the document; and
   outputting the published view of the content from the selected said export portion.

18. A method as described in claim 17, wherein the selecting is performed at least in part based on which of the plurality of export portions that are compatible with the application support a richer display of the content when compared with other said export portions.

19. A method as described in claim 17, wherein the selecting is performed at least in part based on which of the plurality of export portions that are compatible with the application are modifiable by the application.

20. A method as described in claim 17, wherein the determining, the selecting and the outputting are performed by an operating system.

* * * * *